Sept. 11, 1956

C. J. GROSS 2,762,067

SOLE MOLDING MACHINES

Filed Nov. 30, 1953.

Inventor
Charles J. Gross
By his Attorney

Sept. 11, 1956      C. J. GROSS      2,762,067
SOLE MOLDING MACHINES
Filed Nov. 30, 1953      3 Sheets-Sheet 2
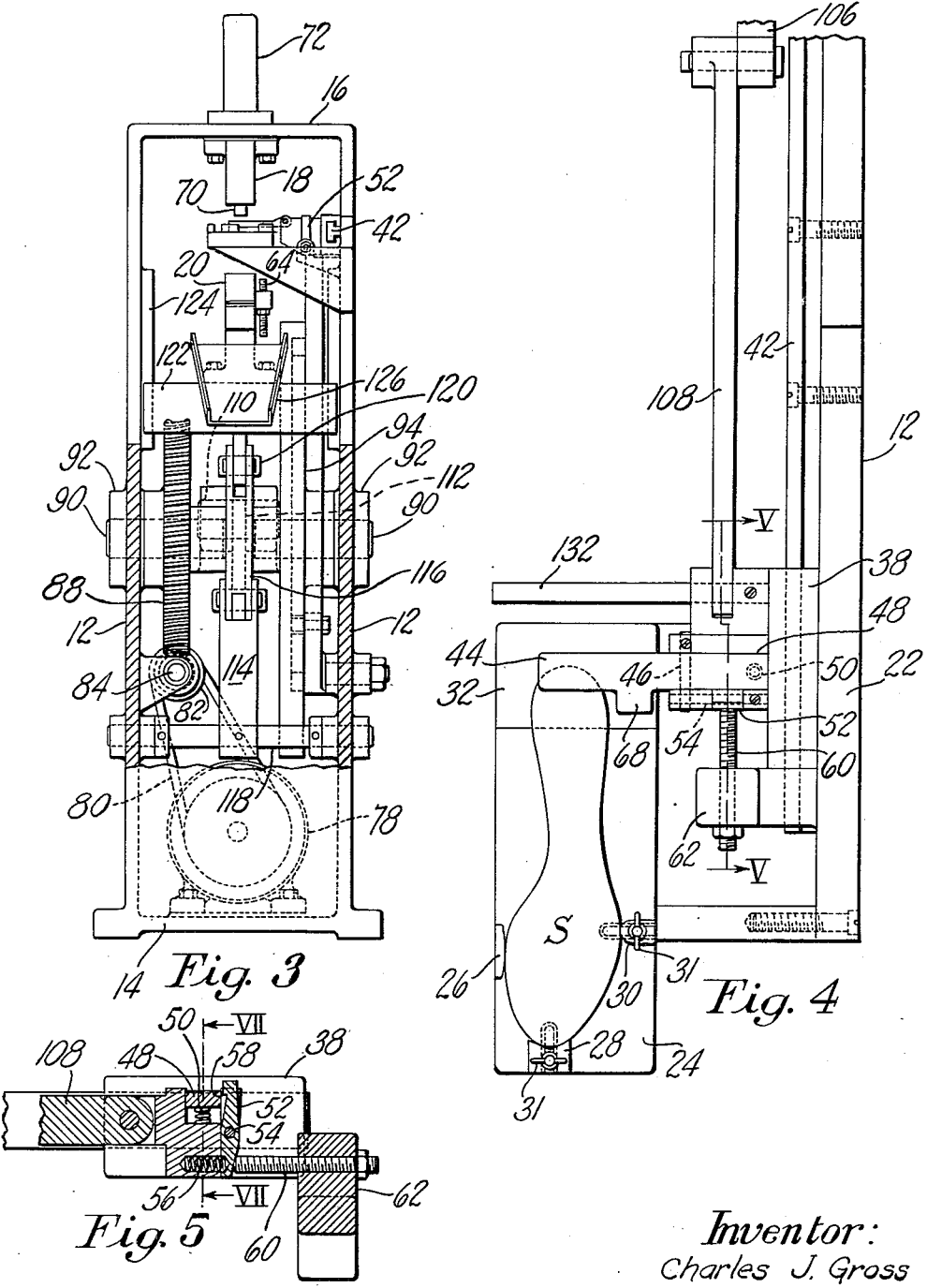
Inventor:
Charles J. Gross
By his Attorney Sept. 11, 1956     C. J. GROSS     2,762,067

SOLE MOLDING MACHINES

Filed Nov. 30, 1953     3 Sheets-Sheet 3

Inventor:
Charles J. Gross
By his Attorney

United States Patent Office 2,762,067
Patented Sept. 11, 1956

2,762,067

SOLE MOLDING MACHINES

Charles J. Gross, Melrose, Mass., assignor to United Shoe Machinery Corporation, Flemington, N. J., a corporation of New Jersey Application November 30, 1953, Serial No. 394,989

12 Claims. (Cl. 12—21)

This application relates to machines for molding articles of leather and similar materials, and is illustrated herein as embodied in a machine for molding shoe soles although it should be understood that the invention is not thus limited in its application.

An object of the invention is to provide an improved sole molding machine in which soles are automatically fed from a loading station into position to be operated upon by a pair of cooperating molds, are molded and are then ejected, the only effort required by the operator being to place the soles in position at the loading station.

In the accomplishment of the above and in accordance with a feature of the invention the machine includes a pair of cooperating molds into operative relation to which a sole is fed from the loading station by a feeding device having relatively movable sole engaging jaws which are automatically closed upon the sole upon movement of the feeding device into a predetermined position at the loading station, and which are automatically opened when the sole is carried by the feeding device into a predetermined position with respect to the molds.

To insure maintaining the proper position of the sole with respect to the molds, and in accordance with another feature of the invention, there is associated with the molds means for clamping the sole against one of the molds, the clamping means being effective simultaneously with the release of the sole from the jaws of the feeding device.

The loading station is in the form of a tray having adjustable gages for determining the position of the sole with relation to the feeding means, and for the convenience of the operator the tray is located at the front of the machine. In accordance with a still further feature of the invention a receptacle for the molded soles is also located at the front of the machine, the soles being ejected from the lower mold by means associated with the feeding device and operative at the conclusion of the molding operation during movement of the feeding device toward the loading station, the sole then moving by gravity into the receptacle.

The above and other features of the invention including various details of construction and novel combinations of parts will now be described by reference to the drawings and pointed out in the claims.

In the drawings,

Fig. 3 is a front elevation partly in section of the machine;

Fig. 4 is a plan view of a portion of the machine illustrating the loading station and the feeding mechanism;

Fig. 5 is a section on the line V—V of Fig. 4;

Figures 1, 2:
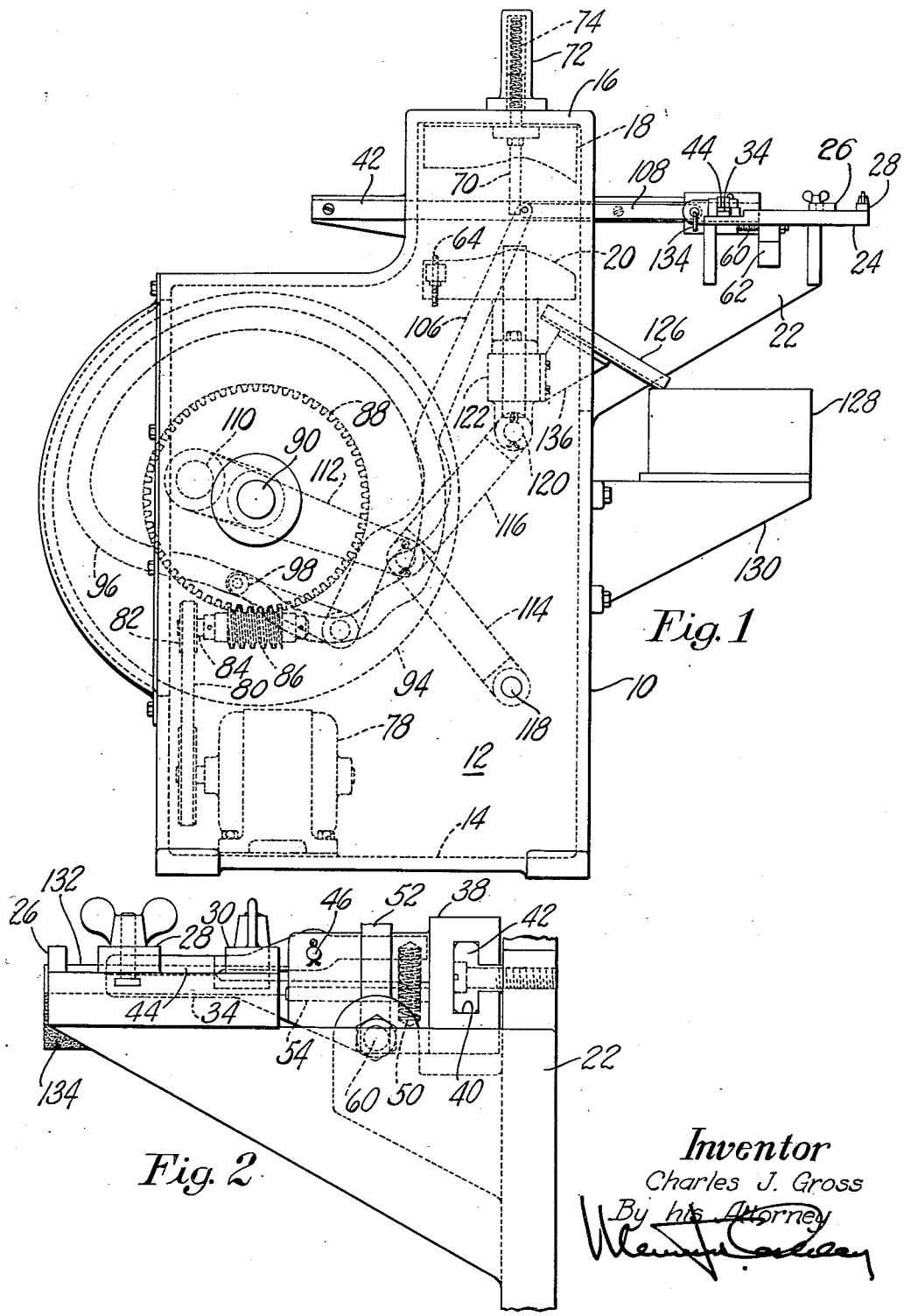
Fig. 1 is a side elevation of one form of machine in which the invention is embodied.
Fig. 2 is a front elevation of a portion of the machine illustrating the loading station and the feeding mechanism.

The machine is illustrated as comprising a frame 10 having side walls 12, a bottom 14 and a top wall 16 (Fig. 3). Carried by the top wall is a female mold 18 with which cooperates a male mold 20 movable toward and away from the female mold, the molds being properly shaped to impart the desired contour to a sole to which pressure is applied when the male mold 20 is in its uppermost position and being long enough to mold the sole throughout its entire length. Either or both of the molds 18 and 20 may be formed of rigid or resilient material but preferably the mold 20 is formed of metal and the mold 18 is formed of hard rubber.

Extending forwardly from the machine frame 10 is a bracket 22 on the forward portion of which is supported a tray 24 providing a loading station to receive a sole S which is to be operated upon. Suitable gages are carried by the tray 24 so that the sole is positioned in a predetermined relation to the molds 18 and 20. As illustrated herein these gages may comprise a fixed gage 26 engageable with the edge of the sole in the vicinity of the ball line, an adjustable toe gage 28 and an adjustable side gage 30 located for engagement with the edge of the sole in the vicinity of the ball line at the other side from the gage 26. It will be obvious that gages 28 and 30 are readily adjustable by the operator according to the size of sole to be operated upon and are held in adjusted positions by wing nuts 31.

The rear end of the tray 24 has a step-down portion 32 providing a space below the heel end of the sole to receive the lower jaw 34 (Fig. 7) of a feeding device 36. The jaw 34 extends laterally from a slide 38 having a T-slot 40 to receive a correspondingly-shaped bar 42 extending forwardly and rearwardly of the machine and secured to one of the side walls 12. The feeding device includes a movable jaw 44 pivoted at 46 to the slide 38 and having a tail portion 48 against which a spring 50 seated in a recess in the slide 38 acts normally to move the jaw 44 toward the jaw 34 to grip the heel end of the sole therebetween.

Figure 7:
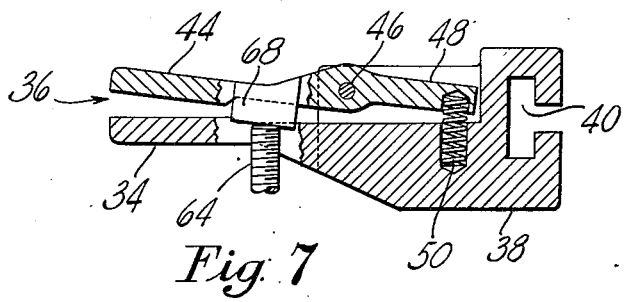
Fig. 7 is a section on the line VII—VII of Fig. 5 but showing the upper jaw of the feeding device in elevated position.

A latch 52 (Fig. 5) is provided for holding the jaw 44 in the position shown in Fig. 7 against the action of the spring 50 except when the feeding device is carrying a sole rearwardly from the tray 24 into position between the molds 18 and 20. The latch 52 is pivoted at 54 to the slide 38 and is urged by a spring 56 in a counterclockwise direction as viewed in Fig. 5 so that with the jaw 44 moved against the action of the spring 50 into the position shown in Fig. 7, a shoulder 58 (Fig. 5) of the latch 52 engages the top surface of the tail portion 48 of the jaw 44. With the feeding device moved forwardly into the position shown in Fig. 4 the lower end of the latch 52 engages an adjustable stop screw 60 carried by a bracket 62 secured to the bracket 22 whereupon the latch is moved in a clockwise direction as viewed in Fig. 5 against the action of the spring 56 so that the upper jaw 44 is moved downwardly by the spring 50 to clamp the heel end of the sole between the upper and lower jaws of the feeding device.

Figure 6:
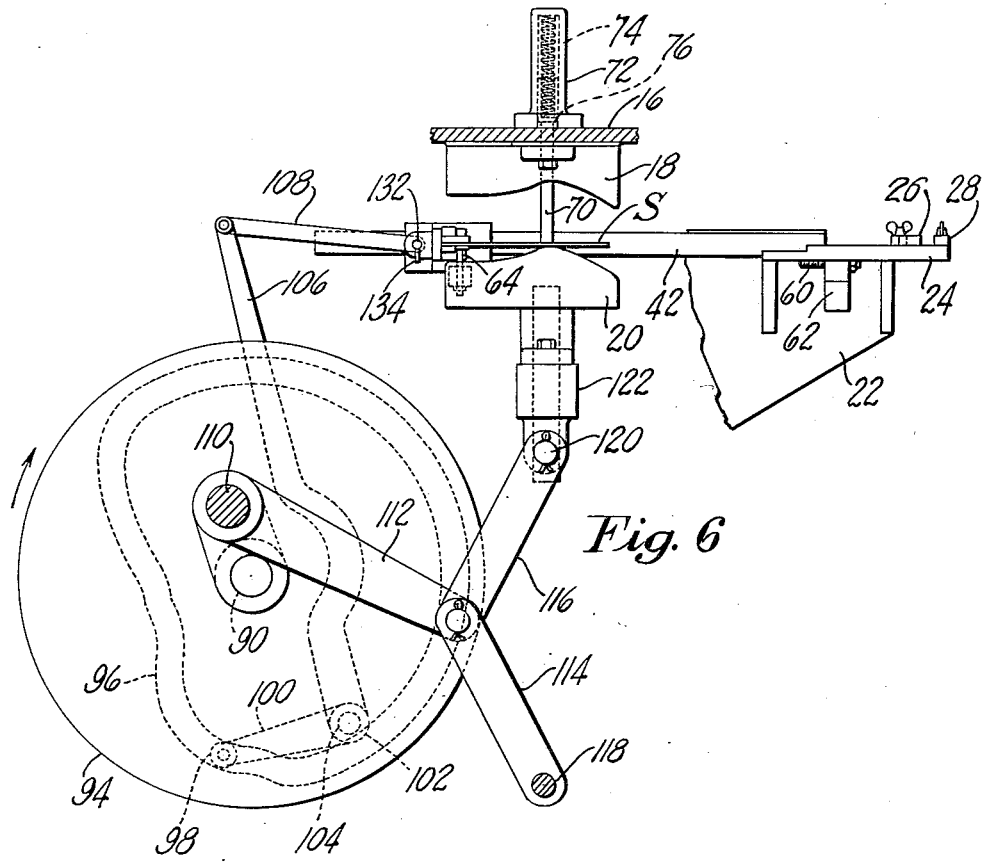
Fig. 6 is a side elevation of the operating mechanism of the machine illustrating a sole positioned between the molds.

Upon rearward movement of the feeding device by mechanism to be described, the sole S is carried into a position above the lower mold 20 as shown in Fig. 6 and it is desirable that when the sole is properly positioned with respect to the mold 20 it should be clamped thereto and simultaneously therewith the jaw 44 moved upwardly to release the sole. As will be explained, the lower mold 20 moves upwardly during the feeding movement of the sole from the tray 24 and when the sole reaches the position shown in Fig. 6 an adjustable screw 64 carried by the mold 20 engages a laterally extending ear 68 carried by the movable jaw 44 to move the jaw upwardly against the action of the spring 50 in which position it is held by the latch 52 until the feeding device returns to its forward position.

At the same time that the sole is released by the feeding device, it is clamped in position by a plunger 70 depending from the upper mold 18 and extending upwardly through the mold, its upper end being guided by a cylinder 72 carried by the top of the machine. A spring 74 (Fig. 6) acts between the top of the cylinder and the upper end of the plunger normally to urge the plunger downwardly to a position determined by engagement of a shoulder 76 near the upper end of the plunger with the top 16 of the machine frame. Upon upward movement of the lower mold 20 to operate on the sole S, the plunger 70 moves upwardly compressing the spring 74 until its lower end moves into the lower surface of the mold 18.

For moving the lower mold 20 vertically and the feeding device 36 horizontally, an electric motor 78 carried by the bottom 14 of the machine frame 10 is provided. The shaft of the motor is connected by a belt 80 to a pulley 82 on a shaft 84 carrying a worm 86. This worm drives a worm gear 88 fast on a crankshaft 90 the ends of which are journaled in bearings 92 formed in the side walls 12 of the machine frame. Secured to the shaft 90 is a cam 94 having a cam track 96 (Fig. 6) in a face thereof which receives a cam follower 98 carried by an arm 100 of a bell crank lever 102. This lever is carried by a shaft 104 extending laterally of the machine and carried by one of the side walls 12. The bell crank lever 102 includes an upwardly extending arm 106, the upper end of which is connected by a link 108 to the slide 38 by which the jaws 34, 44 of the feeding device are carried. The crankshaft 90 rotates in a clockwise direction as viewed in Figs. 1 and 6 and upon movement through an angle of approximately 45° from the position of Fig. 1 to that of Fig. 6, the feeding device moves from its forwardmost position into the position of Fig. 6 in which the sole is carried into the position illustrated between the molds 18 and 20 to be operated upon by the molds.

As shown in Fig. 3 the shaft 90 has a crank portion 110 to which is connected one end of a link 112 (Fig. 6), the other end of which is connected to the knee of a toggle composed of links 114 and 116. The lower toggle link 114 is carried by a shaft 118 carried by the side walls 12 of the machine frame and the upper end of the toggle link 116 is pivoted at 120 to a vertical slide member 122 carrying the lower mold 20. The slide member 122 extends transversely of the machine frame as shown in Fig. 3 and is guided for vertical movement by vertical ribs 124 formed on the inner faces of the sides 12 of the machine frame, the slide member 122 being provided with vertical recesses to receive the ribs 124. The shape of the cam track 96 and its relationship to the crank portion 110 of the shaft 90 is such that the lower mold 20 reaches the position shown in Fig. 6 to clamp the sole S between the mold 20 and the plunger 70 just as the sole has moved into the desired relation to the upper and lower molds for the molding operation. The screw 64 carried by the lower mold 20 is adjusted to move the upper jaw 44 out of engagement with the sole at the same time that the sole reaches the position shown in Fig. 6 so that the feed device can continue moving rearwardly or to the left as shown in Fig. 6, without carrying the sole S with it.

Upon continued clockwise movement of the crankshaft 90 the toggle 114, 116 straightens further to move the lower mold 20 and the sole S clamped thereto upwardly into engagement with the upper mold 18 to impart the desired shape to the sole. The mold 20 then moves downwardly and the feeding device starts moving forwardly and after the sole S is carried out of contact with the plunger 70 the sole is pushed forwardly from the lower mold 20 whence it is guided by a chute 126 (Fig. 1) into a receptacle 128 carried by a shelf 130 at the front of the machine. For pushing the sole off the lower mold 20 the slide 38 of the feeding device carries a laterally extending supporting bar 132 (Fig. 6) for a strip 134 of rubber or other suitable material depending from the bar 132. The strip 134 extends downwardly below the lower jaw 34 of the feeding device and it will be understood that during the return movement of the feeding device the lower mold 20 and the molded sole S carried thereby will be moving downwardly so that the jaws of the feeding device clear the highest portion of the mold 20. However, during this forward movement of the feeding device, the rubber strip 134 contacts the molded sole pushing it forwardly with respect to the mold 20 whereupon it is carried by the chute 126, into the receptacle 128. The chute 126 is carried by a bracket 136 secured to the front face of the vertical slide 122.

From the above it will be seen that the mold 20 is continually reciprocated up and down and the feeding device is continually moved rearwardly and then forwardly in time relation to the movements of the lower mold 20. Consequently it is necessary for the operator merely to place the work pieces one at a time on the tray 24, the proper location of the work pieces being facilitated and insured by the gages 26, 28 and 30 carried by the tray. The feeding device engages the heel end of each sole, moving the sole rearwardly into a predetermined position between the molds whereupon the sole is clamped and released from the feeding device and then subjected to heavy molding pressure following which the molded sole is moved forwardly into the receptacle 128 and the feeding device moves forwardly to engage another sole which in the meantime has been placed on the tray 24. With this arrangement there is no danger to the operator of having his fingers caught between the molds 18 and 20, the entire operation being automatic except for the placing of the soles in a loading position on the tray 24 and the finished work is deposited in the receptacle 128 in a position not far removed from the loading station but convenient to the operator. Because the feeding device moves out of engagement with the sole when the sole is positioned between the molds, the feeding device does not interfere with molding the sole throughout its entire length.

Having thus described my invention what I claim as new and desire to secure by Letters Patent of the United States is:

1. In a sole molding machine, spaced upper and lower molds, means for moving one of said molds vertically into and out of operative relation to the other mold, a sole feeding device reciprocable along a path extending lengthwise between said molds and terminating beyond the opposite ends of the molds, said feeding device including relatively movable sole engaging jaws, means for reciprocating said device along said path, means for closing said jaws in response to movement of said device into one extreme position along said path, and means operated by said movable mold for opening said jaws in the movement of said device toward the other extreme position when the sole carried thereby is in a predetermined position relatively to said molds.

2. In a sole molding machine, spaced upper and lower molds, means for moving one of said molds vertically into and out of operative relation to the other mold, a sole feeding device reciprocable along a path extending lengthwise between said molds and terminating beyond the opposite ends of the molds, said feeding device including relatively movable sole engaging jaws, means for reciprocating said device along said path, means for closing said jaws in response to movement of said device into one extreme position along said path, means for opening said jaws in the movement of said device toward the other extreme position when the sole carried thereby is in a predetermined position relatively to said molds, and a sole ejecting member associated with said feeding device and operative upon movement of said device toward said one extreme position to move the sole from the lower mold.

3. In a sole molding machine, spaced upper and lower molds, means for moving one of said molds vertically into and out of operative relation to the other mold, a sole feeding device reciprocable along a path extending lengthwise between said molds and terminating beyond the opposite ends of the molds, said feeding device including relatively movable sole engaging jaws, means for reciprocating said device along said path, means for closing said jaws in response to movement of said device into one extreme position along said path, means operated by said movable mold for opening said jaws in the movement of said device toward the other extreme position when the sole carried thereby is in a predetermined position relatively to said molds, and means operable simultaneously with said last-named means for clamping the sole to said lower mold.

4. In a machine for molding a sole throughout its entire length, spaced upper and lower molds of a length sufficient to mold an entire sole, means for moving one of said molds into and out of operative relation to the other mold, a loading tray at the front of the machine, gages associated with said tray for locating a sole in a predetermined position thereon, means for feeding the sole rearwardly from said tray into a predetermined position between said molds, a retractable plunger extending through one of said molds for holding the sole in said position against the other mold, a receptacle at the front of the machine, and means operative at the conclusion of the molding operation for moving the molded sole into said receptacle.

5. In a sole molding machine, a loading tray at the front of the machine, spaced upper and lower molds in line with and spaced rearwardly from said tray, means for moving one of said molds toward and away from the other to mold a sole placed therebetween, a feeding device movable between said molds from a position forwardly thereof adjacent to said loading tray to a position rearwardly of said molds, said feeding device comprising means for gripping a sole on the loading tray and for moving the sole rearwardly into a position between said molds, means for releasing said gripping means when the sole is moved into a predetermined position between the molds prior to completion of movement of the feeding device into its rearward position, and means associated with said feeding device for moving the sole forwardly of said molds upon forward movement of the feeding device at the conclusion of the molding operation.

6. In a sole molding machine, a loading tray at the front of the machine, spaced upper and lower molds in line with and spaced rearwardly from said tray, means for moving one of said molds toward and away from the other to mold a sole placed therebetween, a feeding device movable between said molds from a position forwardly thereof adjacent to said loading tray to a position rearwardly of said molds, said feeding device comprising means for gripping a sole on the loading tray and for moving the sole rearwardly into a position between said molds, means for releasing said gripping means when the sole is moved into a predetermined position between the molds prior to completion of movement of the feeding device into its rearward position, means associated with said feeding device for moving the sole forwardly of said molds upon forward movement of the feeding device at the conclusion of the molding operation, a receptacle at the front of the machine, and a guide for directing the molded sole into said receptacle.

7. In a sole molding machine, spaced upper and lower molds, means for feeding a sole from a loading station into a predetermined position between said molds, a drive shaft, means operated by said drive shaft for moving one of said molds into and out of operative relation to the other mold and for moving said feeding means in timed relation thereto, said feeding means including relatively movable normally closed work gripping jaws, a latch for holding the jaws open, means operative upon movement of said feeding means into said loading station for releasing the latch whereupon said jaws close, and means movable with said one of said molds for opening the jaws at a predetermined time in the movement of the feeding means to release the sole from the feeding means permitting movement of the feeding means beyond the molds without moving the sole therebeyond.

8. In a sole molding machine, spaced upper and lower molds, means for feeding a sole from a loading station into a predetermined position between said molds, a drive shaft, means operated by said drive shaft for moving the lower mold into and out of operative relation to the other mold and for moving said feeding means in timed relation thereto, said feeding means including relatively movable normally closed work gripping jaws, a latch for holding the jaws open, means operative upon movement of said feeding means into said loading station for releasing said latch whereupon said jaws close, means movable with the lower mold for opening the jaws at a predetermined time in the movement of the feeding means to release the sole from the feeding means permitting movement of the feeding means beyond the molds without moving the sole therebeyond, and a retractable plunger extending downwardly through the upper mold and arranged to clamp the sole against the lower mold upon opening the jaws of the feeding means.

9. In a sole molding machine, spaced upper and lower molds, means for feeding a sole from a loading station into a predetermined position between said molds, a drive shaft, means operated by said drive shaft for moving the lower mold into and out of operative relation to the other mold and for moving said feeding means in timed relation thereto, said feeding means including relative movable normally closed work gripping jaws, a latch for holding the jaws open, means operative upon movement of said feeding means into said loading station for releasing said latch whereupon said jaws close, means movable with the lower mold for opening the jaws at a predetermined time in the movement of the feeding means to release the sole from the feeding means permitting movement of the feeding means beyond the molds without moving the sole therebeyond, a retractable plunger extending downwardly through the upper mold and arranged to clamp the sole against the lower mold upon opening the jaws of the feeding means, and means operative upon return of said feeding means toward the loading station to move the molded sole from the lower mold, said means comprising a flexible member engageable with the upper surface of the mold and with the sole thereon.

10. In a sole molding machine, spaced upper and lower molds, a loading tray carried by the machine forwardly of said molds and in substantial alinement therewith, gages carried by said loading tray for locating a sole in a predetermined position thereon, means for feeding a sole from said loading tray into a predetermined position between said molds, a drive shaft, means operated by said drive shaft for moving the lower mold into and out of operative relation to the upper mold and for moving said feeding means in timed relation thereto, said feeding means incuding relatively movable normally closed sole gripping jaws, a latch for holding the jaws open, means operative upon movement of said feeding means to a position adjacent to the loading tray for releasing said latch whereupon said jaws close to grip a sole carried by the tray, and means movable with the lower mold for opening the jaws at a predetermined time in the movement of the feeding means to release the sole from the feeding means permitting movement of the feeding means rearwardly beyond the molds without moving the sole therebeyond.

11. In a sole molding machine, spaced upper and lower molds, a loading tray carried by the machine forwardly of said molds and in substantial alinement therewith, gages carried by said loading tray for locating a sole in a predetermined position thereon, means for feeding a sole from said loading tray into a predetermined position between said molds, a drive shaft, means operated by said drive shaft for moving the lower mold into and out of operative relation to the upper mold and for moving said feeding means in timed relation thereto, said feeding means including relatively movable normally closed sole gripping jaws, a latch for holding the jaws open, means operative upon movement of said feeding means to a position adjacent to the loading tray for releasing said latch whereupon said jaws close to grip a sole carried by the tray, means movable with the lower mold for opening the jaws at a predetermined time in the movement of the feeding means to release the sole from the feeding means permitting movement of the feeding means rearwardly beyond the molds without moving the sole therebeyond, and a retractable plunger extending downwardly through the upper mold for engaging the sole and clamping it against the lower mold simultaneously with the opening of the jaws.

12. In a sole molding machine, spaced upper and lower molds, a loading tray carried by the machine forwardly of said molds and in substantial alinement therewith, gages carried by said loading tray for locating a sole in a predetermined position thereon, means for feeding a sole from said loading tray into a predetermined position between said molds, a drive shaft, means operated by said drive shaft for moving the lower mold into and out of operative relation to the upper mold and for moving said feeding means in timed relation thereto, said feeding means including relatively movable normally closed sole gripping jaws, a latch for holding the jaws open, means operative upon movement of said feeding means to a position adjacent to the loading tray for releasing said latch whereupon said jaws close to grip a sole carried by the tray, means movable with the lower mold for opening the jaws at a predetermined time in the movement of the feeding means to release the sole from the feeding means permitting movement of the feeding means rearwardly beyond the molds without moving the sole therebeyond, a retractable plunger extending downwardly through the upper mold for engaging the sole and clamping it against the lower mold simultaneously with the opening of the jaws, and means associated with said feeding means for moving the sole forwardly from the lower mold at the conclusion of the molding operation during movement of the feeding means toward the loading tray.

References Cited in the file of this patent

UNITED STATES PATENTS

| | | |
|---|---|---|
| 268,124 | Pope et al. | Nov. 28, 1882 |
| 628,513 | Young | July 11, 1899 |
| 1,337,231 | Jennings | Apr. 20, 1920 |
| 1,342,629 | Jennings | June 8, 1920 |
| 1,880,858 | Davis | Oct. 4, 1932 |
| 2,062,465 | Lutz | Dec. 1, 1936 |
| 2,306,430 | Eppler | Dec. 29, 1942 |

FOREIGN PATENTS

| | | |
|---|---|---|
| 347,130 | Great Britain | Apr. 22, 1931 |